Figure 1:
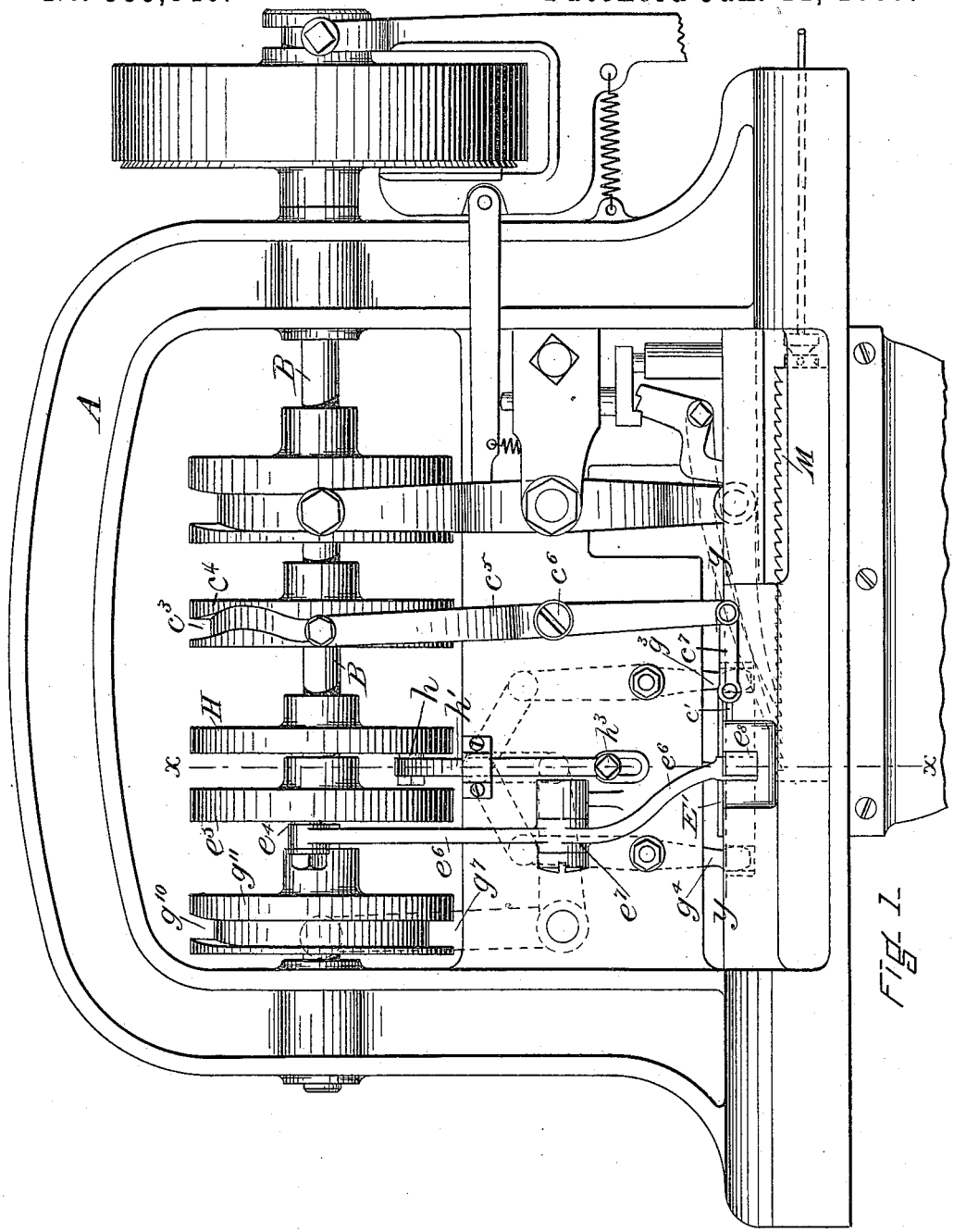

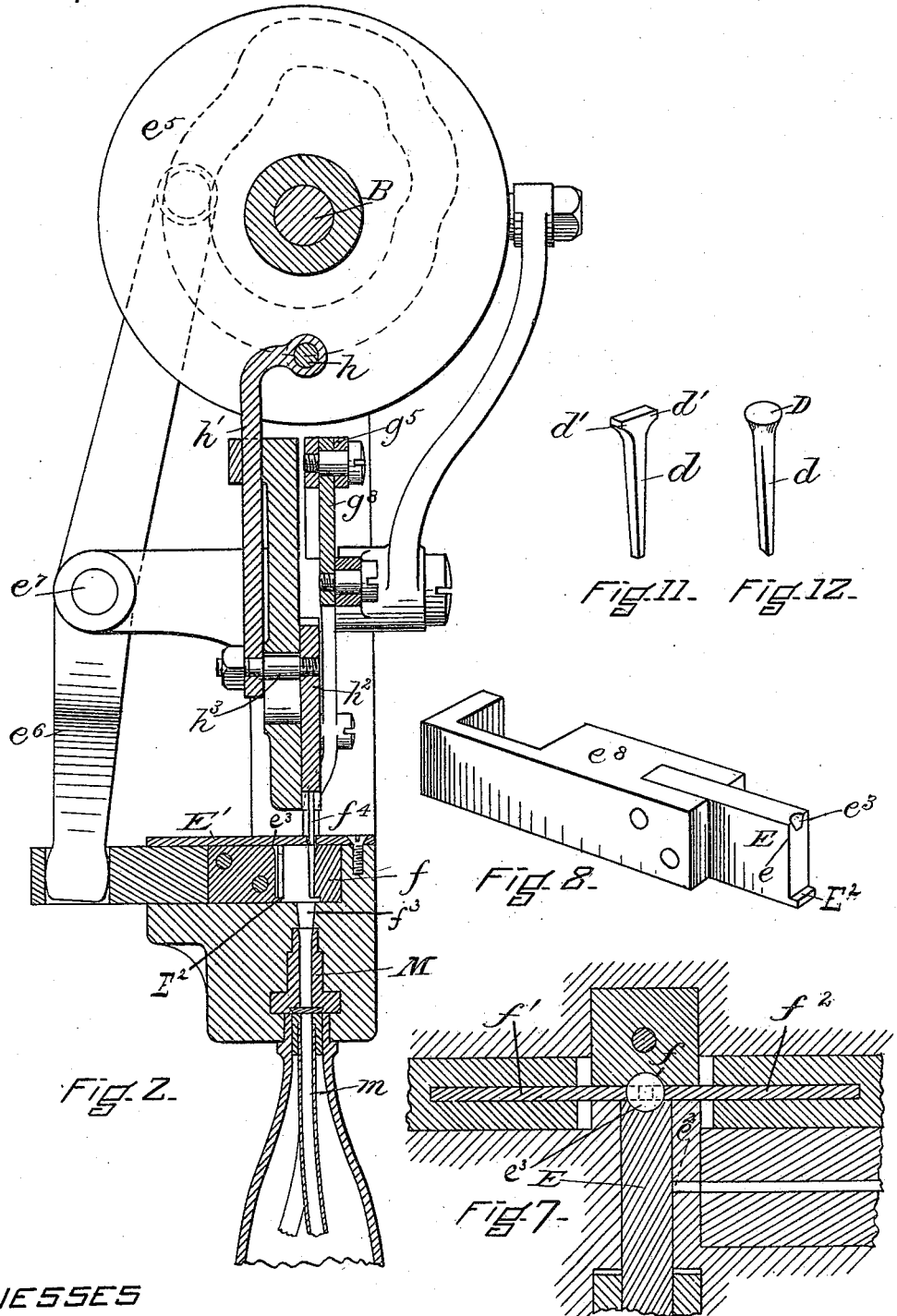

(No Model.) 4 Sheets—Sheet 3.

F. F. RAYMOND, 2d.
NAIL MAKING AND DISTRIBUTING MACHINE.

No. 355,840. Patented Jan. 11, 1887.

WITNESSES
INVENTOR (No Model.)  4 Sheets—Sheet 4.
F. F. RAYMOND, 2d.
NAIL MAKING AND DISTRIBUTING MACHINE.
No. 355,840.  Patented Jan. 11, 1887.
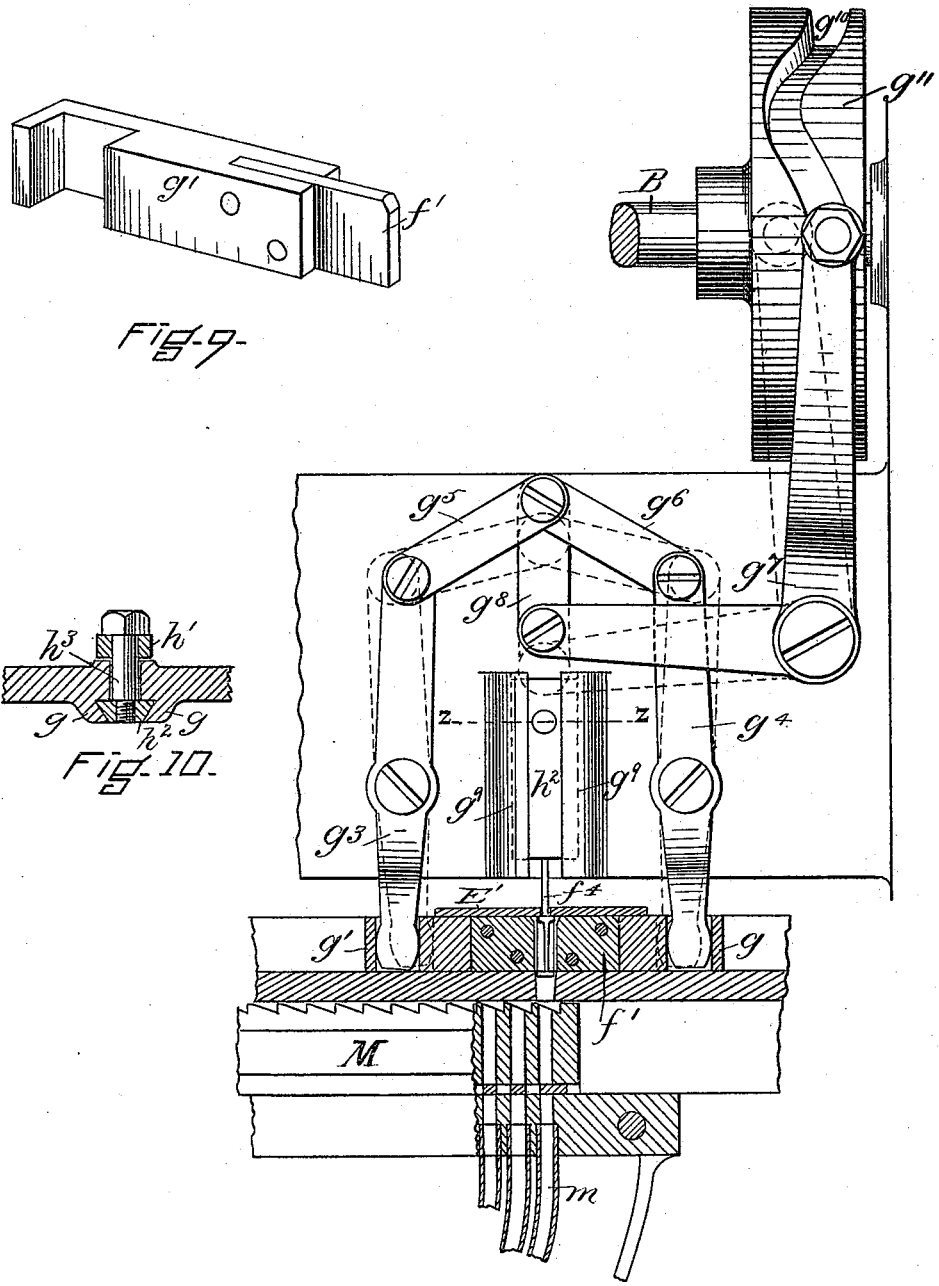
WITNESSES
INVENTOR

UNITED STATES PATENT OFFICE.

FREEBORN F. RAYMOND, 2D, OF NEWTON, MASSACHUSETTS.

NAIL MAKING AND DISTRIBUTING MACHINE.

SPECIFICATION forming part of Letters Patent No. 355,840, dated January 11, 1887.

Application filed November 1, 1886. Serial No. 217,665. (No model.)

*To all whom it may concern:*

Be it known that I, FREEBORN F. RAYMOND, 2d, of Newton, in the county of Middlesex and State of Massachusetts, a citizen of the United States, have invented a new and useful Improvement in Nail Making and Distributing Machines, of which the following is a full, clear, and exact description, reference being had to the accompanying drawings, forming a part of this specification, in explaining its nature.

The invention is especially adapted to form headed nails from flat blanks cut from a strip having shanks extending from a head-connecting margin, the shanks being separated from each other by a space sufficient to provide in the said margin enough metal for the subsequent shaping of the head; and the invention is represented in the drawings as embodied in or forming a part of a heel-nailing machine.

Figure 4:
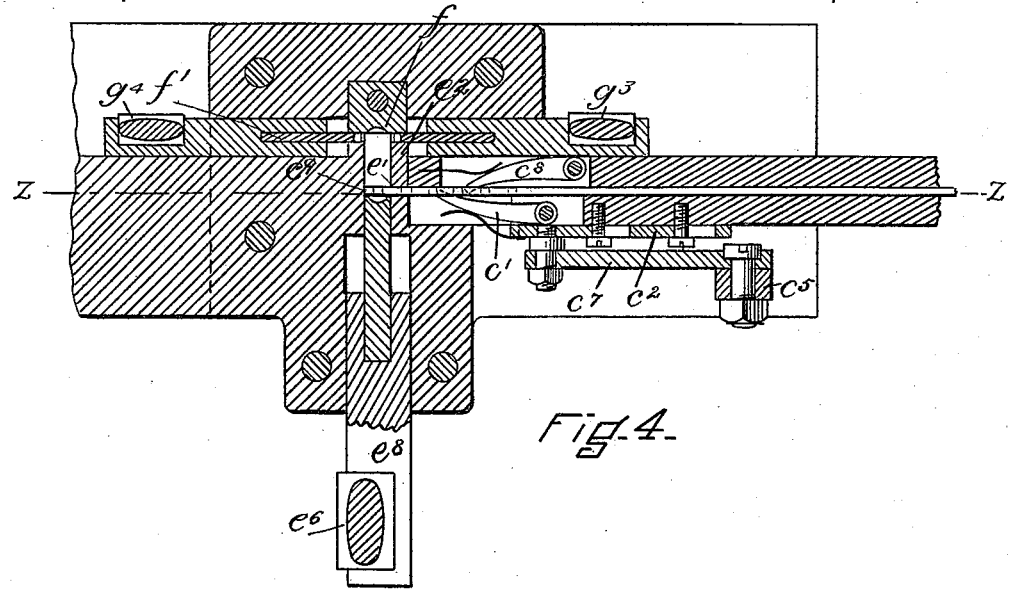
Figure 5:
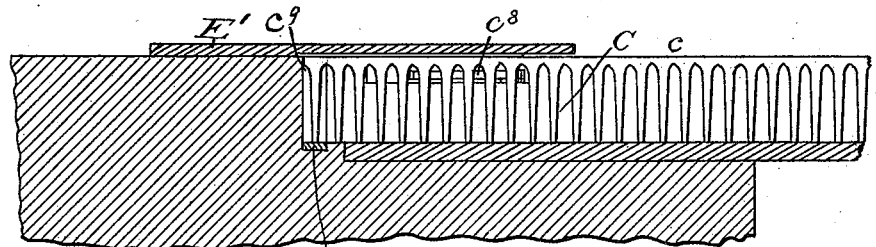
Figure 6:
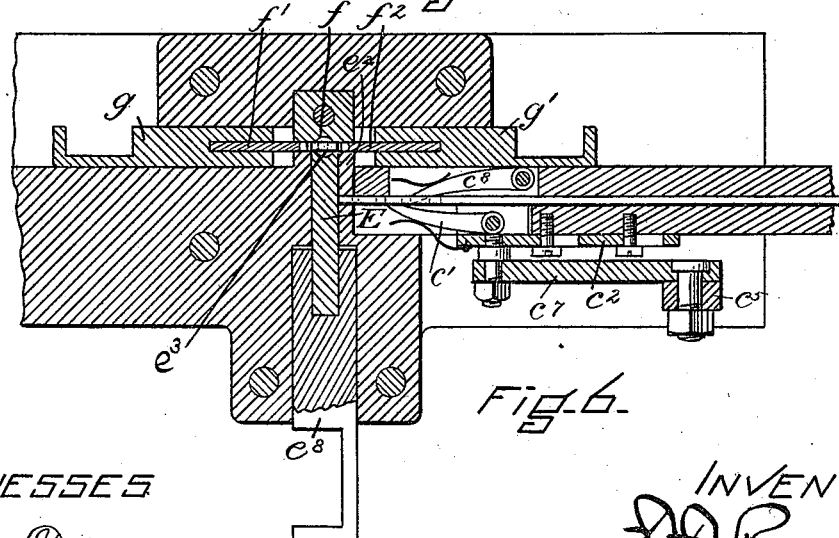

In the drawings, Figure 1 is a view in rear elevation, showing portions of the nail-making devices and the upper part of the nail-distributer. Fig. 2 is a vertical section upon the line $x \, x$ of Fig. 1. Fig. 3 is an enlarged view in detail, to which reference will hereinafter be made, and especially showing the devices for shaping or forming the head of the nail. Fig. 4 is a view in horizontal section upon the line $y \, y$ of Fig. 1, and in plan of the parts below the said line. Fig. 5 is a vertical section upon the line $z \, z$ of Fig. 4. Fig. 6 is a view in substantially the same section represented in Fig. 4, illustrating the parts in a different position. Fig. 7 is a detail view of the head-forming dies. Fig. 8 is a view in perspective of the severing device, which is also a carrier and a die, and its holding-block. Fig. 9 is a view of one of the end dies and its holding-block, to which reference will be made. Fig. 10 is a horizontal section upon the line $z \, z$ of Fig. 3. Fig. 11 is a view in perspective of a nail-blank before heading. Fig. 12 is a view of the headed nail.

A is the frame of the machine.

B is the main shaft.

C is the feedway of the machine, which is adapted to hold the nail-strip $c$ in an upright position, and in which it is arranged to be reciprocated at proper intervals by the feed-pawl $c'$, which is carried by the slide block or plate $c^2$, which is reciprocated by the cam-groove $c^3$ in the cam-disk $c^4$ upon the shaft B, the lever $c^5$, pivoted at $c^6$, and the link $c^7$, connecting the lower end of the lever with the slide block or plate $c^2$. The detent $c^8$ is also arranged to project into the feedway and to close behind the shanks or prongs of the nail-strip, and to hold the same stationary during the return or backward movement of the feed-pawl. The feed-pawl is adapted to move the strip until its end comes in contact with the abutment $c^9$ across the end of the feedway.

There is arranged to be moved across the end of the feedway a cutter to sever from the nail or strip blanks shaped substantially as shown in Fig. 11—that is, blanks having the prongs or shanks $d$ and the head-forming portions $d'$, which are of the same width as the shanks, and which extend from each edge thereof, as shown. These head-forming portions $d'$ are upset by end pressure to form the regular-shaped head D—that is, a head that shall be round, or substantially round, and shall project uniformly from all sides of the shanks, as represented in Fig. 12; and the central and upper part of the shank may be reduced from a rectangular shape to a circular shape at the same time, if desired. To sever these blanks from the end of the nail-strip and advance them in successive order to the head-forming dies, I use a block, E, the upper part of the edge $e$ of which acts in connection with the edge $e'$ of the plate $e^2$ as shears or cutters in severing the head-connecting section of the blank or strip. The block also has an extension, $E^2$, which is adapted to close under the lower end of the shank of the nail-blank and the die-cavity $e^3$. It is moved in ways across the end of the feedway to sever the nail-blank and advance it to the heading-dies by means of a cam-groove, $e^4$, in the cam-disk $e^5$ of the main shaft B, the lever $e^6$, pivoted at $e^7$, and the block $e^8$, which is connected with the lower end of the lever, and which supports the cutter-block E. The dies for forming or upsetting by end pressure the head-forming section $d'$ of the nail-blank are in four parts—namely, the movable part $e^9$, which I have already referred to, the stationary part $f$, and the two movable parts $f' \, f^2$. The block E acts as a transferrer to transfer the nail-blank from the end of the feedway to the dies. Its foot $E^2$ prevents the nail-blank from falling into the throat $f^3$, which extends therefrom. The lower end of the plunger $f^4$, while the head of the nail is being upset, forms a part of the upper surface of the die or head-forming cavity, and the plunger afterward operates to move the formed nail downward through the throat into the distributer, or, when the machine is used as a nail-driving machine, into the work.

The dies $f\ f'\ f^2$ have sections of a head-forming cavity, and the die $f'$ is mounted upon a slide-block, $g$, and the die $f^2$ in a slide-block, $g'$. These slide-blocks are given simultaneous movements toward and from each other by means of levers $g^3\ g^4$, the toggle $g^5\ g^6$, the lever $g^7$, which is connected with the toggle by the link $g^8$, and the cam-groove $g^{10}$ in the cam-disk $g^{11}$ upon the main shaft B. The lever $g^3$ is adapted to move the block $g$ and the lever $g^4$ the block $g'$.

The plunger is moved to strip the nail from the dies and feed it to the distributer by means of the cam-groove $h$ in the cam-disk H on the shaft B, the slide-bar $h'$ having a cam-pin which enters the said cam-groove, and a block, $h^2$, attached to the slide-bar by the bolt $h^3$ and held by the guide-plates $g^9$, and supporting at its lower end the plunger $f^4$.

The machine is represented as provided with movable nail-receiving block M, like that described in the Towns and Raymond patent, No. 346,137, and having a series of holes adapted to be brought successively in line with the throat $f^3$, to receive the headed nails as they are made, and to deliver them to the passages of the distributer $m$, which is also like that described in said Towns and Raymond patent. The mechanism for reciprocating or moving the distributer and for starting and stopping the machine is similar to that described in said patent, and need not be mentioned here.

In operation the nail-strip is placed in the feedway by hand, or fed thereto automatically, and is advanced with an intermittent movement by the feed-pawl to the severing-block and transferrer E, which severs or cuts in successive order from the end of the strip a nail-blank and carries it to the head-forming dies, the block E moving the blank into position and against the face of the die $f$. The movable dies $f'\ f^2$ are then caused to be closed upon the head-forming sections $d'$ of the blank, and by lateral compression to cause the metal to be upset or formed in the die-cavity. The lower end of the plunger and the cap-plate E' prevent the metal from being forced upward. The carrier-block E is then moved backward, the dies are opened, and the plunger moved downward to strip the nail from them and deliver it to the carrier. When the upper part of the shank of the nail is also formed, the die-blocks are provided with grooves or sections of dies formed to operate thereon.

I prefer to form the nail-blank strip so that the dies may be favored in their operation, and so that there shall be little or no waste in forming the strip. This is accomplished by making the metal of the plate fairly thick and by forming the upper surface of the recesses between the shanks curved, as represented in Fig. 4. This brings the shanks $d$ quite closely together, and so that what would otherwise be the waste cut from between them is provided with the shape of an ordinary heel-nail, and can be used as such. It will be seen that the head-forming cavity is in part covered by the cap-plate E', (see Fig. 3,) which has a hole in which the plunger moves; also, that the cutter and transferrer E, in connection with the stationary block $f$, serve as jaws for holding the block while the head-forming sections are being upset by compression upon the edges thereof by the dies $f'\ f^2$.

The machine is adapted to be automatically set in operation and stopped; but the mechanism for doing this, as well as the mechanism for operating the block M, is like that described in the said Towns and Raymond patent, and need not further be described here.

Having thus fully described my invention, I claim and desire to secure by Letters Patent of the United States—

1. In a nail making and distributing machine, the combination of a feedway and an intermittent feeding device with a blank-carrying block, E, having the die-recess $e^3$, the die $f$, the reciprocating dies $f'\ f^2$, and the plunger $f^4$, substantially as described.

2. The combination of the dies $e^3\ f\ f'\ f^2$ and the plunger $f^4$, substantially as described.

3. The combination of the feedway of the machine with the block E, having the projection $E^2$ and sections $e^3$ of the die, substantially as described.

4. The combination of the feedway of the machine, the block E, having the die-cavity $e^3$, and arranged to be moved across the end of the feedway, the block $e^8$, cam $e^4$, and lever $e^6$, substantially as described.

5. The combination of the dies $f\ e^3\ f'\ f^2$ and the cap-plate E', substantially as described.

6. The combination of the dies $f'\ f^2$, the cam-groove $g^{10}$, the lever $g^3\ g^4$, toggle $g^5\ g^6$, link $g^8$, lever $g^7$, substantially as described.

7. The combination of the feedway of the machine, the intermittent nail shank or strip engaging device for feeding the nail-strip, a cutter and a transferrer for severing the strips into blanks with head-forming portions extending from each edge thereof, and dies for upsetting the said head-forming portions by lateral compression, the throat $f^3$, and the nail-distributer M, substantially as described.

8. The combination, in a nail-making machine, of the blank-holding device E $f$ and the movable dies $f'\ f^2$, for exerting compression upon the edges of the head-forming sections of the blank, substantially as described.

9. The combination, with the holding devices E $f$ and cap-plate E', of the dies $f'\ f^2$, movable toward and from each other while the blank is held between the two holding devices, the throat $f^3$, and the movable nail-receiving block M, substantially as described.

10. The combination, in a nail-making machine, of mechanism for feeding the nail-strip with an intermittent movement to a severing device, a severing device for severing the head-connecting portions of the strip and forming a blank with head-forming sections extending from each edge thereof, devices for presenting the blank thus formed to heading-dies, said heading-dies adapted to be moved horizontally against the edges of the head-forming section to upset the same by lateral compression to form a head to the blank, and a plunger, $f^4$, for removing or stripping the nail from the dies after the completion of the heading operation, substantially as described.

11. The combination, in a nail-making machine, of mechanism for feeding the nail-strip by its prongs with an intermittent movement to a severing device, a severing device for severing the head-connecting portion of the strip and forming a blank with head-forming sections extending from each edge thereof, devices for presenting the blank thus formed to heading-dies, said heading-dies adapted to be moved horizontally against the edges of the head-forming section for upsetting the same by lateral compression, a plunger and movable receiving block M, substantially as described.

12. The combination, in a nail-making machine, of mechanism for feeding the nail-strip by its prongs with an intermittent movement to a severing device, a severing device for severing the head-connecting portions of the strip and forming a blank with head-forming sections extending from each edge thereof, devices for presenting the blank thus formed to heading-dies, said heading-dies adapted to be moved horizontally against the edges of the head-forming section for upsetting the same by lateral compression, a plunger, $f^4$, a movable receiving-block, M, and distributer $m$, substantially as described.

FREEBORN F. RAYMOND, 2D.

Witnesses:
    FRED. B. DOLAN,
    J. M. DOLAN.